United States Patent [19]
Drucker

[11] Patent Number: 5,812,393
[45] Date of Patent: Sep. 22, 1998

[54] INTERPRETIVE BIOS MACHINE AND METHOD OF USE THEREOF

[75] Inventor: Steven Jay Drucker, Atlanta, Ga.

[73] Assignee: Microwave Science, LLC, Norcross, Ga.

[21] Appl. No.: 647,568

[22] Filed: May 14, 1996

[51] Int. Cl.⁶ ................................................. G05B 11/01
[52] U.S. Cl. .................... 364/144; 364/142; 364/143; 364/144; 364/477.05; 219/702; 219/720
[58] Field of Search ..................................... 364/143, 144, 364/477.05, 147, 142; 395/567, 651, 652; 219/703, 710, 719, 702, 720; 99/325; 126/39 R, 299 R, 299 F, 299 D; 345/567

[56] References Cited

U.S. PATENT DOCUMENTS

| | | | |
|---|---|---|---|
| 4,271,479 | 6/1981 | Cheselka et al. | 364/900 |
| 4,309,584 | 1/1982 | Terakami | 219/10.55 B |
| 4,317,976 | 3/1982 | Noda | 219/10.55 F |
| 4,323,773 | 4/1982 | Carpenter | 235/473 |
| 4,345,132 | 8/1982 | Takase et al. | 219/10.55 B |
| 4,356,370 | 10/1982 | Horinouchi | 219/10.55 B |
| 4,375,586 | 3/1983 | Ueda | 219/10.55 B |
| 4,413,168 | 11/1983 | Teich | 219/10.55 B |
| 4,420,668 | 12/1983 | Larson et al. | 219/10.55 B |
| 4,447,693 | 5/1984 | Buck | 219/10.55 M |
| 4,510,594 | 4/1985 | Johnson, Jr. | 370/15 |
| 4,517,429 | 5/1985 | Horinouchi | 219/10.55 B |
| 4,568,810 | 2/1986 | Carmean | 219/10.55 B |
| 4,629,848 | 12/1986 | Yokozeki et al. | 219/10.55 B |
| 4,642,755 | 2/1987 | Hinch | 364/200 |
| 4,697,057 | 9/1987 | Fowler | 219/10.55 B |
| 4,780,588 | 10/1988 | Edamura | 219/10.55 B |
| 4,812,606 | 3/1989 | Eke | 219/10.55 B |
| 4,816,635 | 3/1989 | Edamura | 219/10.55 B |
| 4,837,414 | 6/1989 | Edamula | 219/10.55 B |
| 4,933,527 | 6/1990 | Edamura | 219/10.55 B |
| 4,972,060 | 11/1990 | Edamura | 219/10.55 B |
| 5,067,072 | 11/1991 | Talati et al. | 395/650 |
| 5,088,031 | 2/1992 | Takasaki et al. | 395/400 |
| 5,136,711 | 8/1992 | Hugard et al. | 395/700 |
| 5,221,817 | 6/1993 | Ota | 219/10.55 B |
| 5,272,300 | 12/1993 | Edamura | 219/10.55 B |
| 5,274,209 | 12/1993 | Edamura | 219/10.55 B |
| 5,291,608 | 3/1994 | Flurry | 395/725 |
| 5,321,232 | 6/1994 | Ogle | 219/506 |
| 5,345,067 | 9/1994 | Ohta et al. | 219/720 |
| 5,349,344 | 9/1994 | Head | 340/825.23 |
| 5,365,606 | 11/1994 | Brocker et al. | 395/650 |
| 5,367,680 | 11/1994 | Flurry et al. | 395/650 |
| 5,408,526 | 4/1995 | McFarland et al. | 379/202 |
| 5,438,663 | 8/1995 | Matsumoto et al. | 395/162 |
| 5,454,110 | 9/1995 | Kannan et al. | 395/700 |
| 5,455,958 | 10/1995 | Flurry et al. | 395/800 |
| 5,545,880 | 8/1996 | Bu et al. | 219/703 |
| 5,545,881 | 8/1996 | Chai et al. | 219/719 |
| 5,564,594 | 10/1996 | Monfredo | 221/150 A |
| 5,575,943 | 11/1996 | Lee | 219/710 |
| 5,579,496 | 11/1996 | Van Steenbrugge | 395/567 |
| 5,648,038 | 7/1997 | Fathi et al. | 264/406 |

*Primary Examiner*—Reba I. Elmore
*Assistant Examiner*—Ramesh Patel
*Attorney, Agent, or Firm*—Bernstein & Associates, PC

[57] ABSTRACT

The present invention provides an interpretive BIOS machine for controlling the cooking of food in a microwave oven or the conduct of a physical, chemical, or thermodynamic process stream wherein the microwave oven or process stream functionally operates by user independent commands. The interpretive BIOS machine is implemented by a microprocessor or computer having a memory for the storing of a program that contains the operating instruction for the present invention. Data is received into the interpretive BIOS machine from a data entry mechanism. That data is specific code that represents a plurality of desired cooking or process instructions selected by the user of the microwave oven or process stream. The present invention interprets the received data and transforms that data into time duration(s) and scaled power level(s) settings for the microwave oven or process stream.

12 Claims, 9 Drawing Sheets

INTERPRETIVE BIOS MACHINE AND METHOD OF USE THEREOF

FIELD OF THE INVENTION

The invention relates generally to a system for physical or chemical process control In particular, the invention is directed to an interpretive BIOS machine for controlling a chemical or physical process such as heating an object or objects, such as food, within a microwave oven. The invention is more particularly directed to an interpretive BIOS machine for interpreting a plurality of data and using that data to control the course and sequence of a physical, chemical, or thermodynamic process stream, such as the heating of specimens or food items performed within a microwave oven.

BACKGROUND OF THE INVENTION

A microwave oven cooks food by bombarding the food with electromagnetic waves which cause molecules in the food to vibrate billions of times per second. Heat is created when dipolar molecules (such as water) rotate back and forth aligning themselves with the electric field or when the ions migrate in response to the electric field.

The vibrations cause heat by friction, although only at a depth of 1 to 1.5 inches. Heat transfer properties of food continue the process of cooking by transmitting heat to areas of the cooking food that are relatively cool in comparison to the areas that have been heated by the electromagnetic waves.

Convenience of the microwave oven and reduced preparation time are key factors in the success of the microwave oven. Taste and quality of the food after being cooked in the microwave oven were at times lacking with early models. Convenience was also lacking because the demand for microwavable food increased so did the complexity of instructions for cooking that food. Imprecision of cooking instructions was fostered by among other factors the differing user interfaces and operational characteristics of dissimilar and similar sized microwave ovens and allied microwave oven operational control and user interface disparities. Consumers want the convenience of microwave cooking but do not want to constantly refer back to a package to enter and re-enter multistep instructions into a microwave oven to obtain cooked food, and still, after all their efforts receive sub-standard cooking results due to microwave oven operational and performance variances.

Because of more active lifestyles and less time spent in the kitchen, consumer demand for microwavable products is increasing along with the demand for a microwave oven that does not require a plurality of instructions to cook food; or different instructions for the same food item for different size and/or manufactured microwave ovens. Complicating the issue of product demand and usable microwave ovens is the wide variance in magnetron output power, performance variances, and user control interfaces now prevalent in the available universe of microwave ovens. A food product that may cook very well in a 1200 watt oven may take 3 times as long in an oven which can only provide 600 watts of power; and the user interface from microwave ovens of one manufacturer to another is at the least markedly different and non-intuitive.

Microwave ovens presently in use employ various data entry mechanisms to input data into an oven control mechanism. These data entry mechanisms may be electrical and mechanical keyboards, card readers, light pens, or wands. The control mechanism may be a computer or a microprocessor based controller. In general, the computer or controller has a basic input and output system (BIOS) associated with the input and output of data to and from the data entry mechanism. In such microwave ovens the user manually actuates the data entry mechanism to enter data relating to the type or mode of oven operation desired, i.e., bake, roast, re-heat, etc., as well as the length of the desired cooking time.

Present microprocessor-based controllers are capable of receiving a substantial amount of complex information from their associated data entry mechanism. This requires the oven user or process stream designer to manually enter a substantial amount of information generally in a multi-step series of data inputs on a keyboard. This information could be entered by a magnetic card containing all of the required input data, but this type of format does not allow flexibility in changing the cooking instructions. Alternately, user input could recall a stored recipe specific to a particular food item. Those familiar with the art can see that an item-specific stored recipe system is static and inherently limited to the universe of food items known to its author at its moment of creation. Such a system is closed to food items or processes created subsequent to its moment of manufacture, and, in any event, is a stored recipe system specific and limited to a single host microwave oven or process stream performance set.

In the manufacture of consumer appliances, such as microwave ovens, it is advantageous to assume that the overall control requirements are nearly the same from model to model. This is done to reduce the cost of manufacture of the microwave ovens and make the repair of the ovens more economical. The functions of the microwave oven such as "auto cook", "auto defrost" and a number of other cooking parameters associated with these functions vary from model to model, depending upon such factors as microwave cavity size, magnetron size, and other factors well known to practitioners in the art. Thus a controller may be required to operate correctly in different microwave oven chassis having different oven cooking cavities. Typical oven cavity size ranges from about 0.5 cubic feet to about 2.0 cubic feet. The ovens also may vary in their effective magnetron power output.

Microwave power output can be controlled using two methods. The first is duty cycle control, and the second is amplitude modulation. In duty cycle control, the average output can be adjusted by operating the magnetron at full rated power, while switching its current on and off for portions of a time interval. The percentage of time that the current is in during the time interval is referred to as the "duty cycle."

Magnetron power output is proportional to its cathode current. In amplitude modulation, the cathode current is adjusted to control the instantaneous magnetron output. The instantaneous magnetron current is controlled either by varying the level of high voltage to the magnetron or by changing the magnetic field intensity in the magnetron.

Microprocessor based controllers are in widespread use in commercially available microwave ovens. Typically, the only difference in the command and control from one oven to the next is the programming stored within the controller's memory. It is quite feasible for control programs stored permanently in read only memory (ROM) to include parameters and instructions appropriate for a variety of oven models. Nevertheless, there remains the problem of identifying to the controller the particular oven and different oven or process stream functional characteristics of the host unit in which the controller resides. This particular problem is complicated over time by the introduction of newer models of microwave ovens. Newer models may contain newer microprocessors and different functional characteristic sets that require different operating instructions.

Microwave ovens having compatible hardware can interact and share data. It has been possible in the past to exchange software between identical types of machines. To the contrary, most interactions between incompatible machines still involve little more than simple transfer of data files or the like. Software applications written for one microwave oven manufacturer or for one specific type of operating environment, however, cannot normally be ported or "transferred" to a system having different physical characteristics without being entirely rewritten. While much progress has made in developing techniques for exchanging data between incompatible machines, it has not been possible to exchange software application programs between different microwave ovens.

Data presented in the form of recipe instructions that offer static cooking conditions differ on characteristics of the material to be cooked. The material inherently varies in dielectric property, relative dielectric constant, and loss factor. These properties govern both heating rate and uniformity, the latter being influenced by the depth of penetration of the microwave energy. Accordingly, conventional fixed cooking program functions do not allow the entry of data concerning the conditions of the material to be cooked into memory of the computer or controller of a microwave oven. As a result two materials would be cooked under the same cooking conditions in spite of having different material characteristics and cooking profiles. This causes an undesirable cooking operation.

It would be desirable to have a microwave oven or process control system that could accept pre-defined user entered programming information that could be interpreted and scaled to varying magnetron performance or process performance level(s) and power level duration(s) specific to a particular host unit. As the result of a single user entered predefined code, the final end result of a process performed for a particular item would be independent of and produce identical results upon the item regardless of the functional operating characteristics of any particular host microwave oven or process stream into which the user entered predefined code is input.

SUMMARY OF THE INVENTION

The present invention provides an interpretive BIOS machine for controlling the cooking of food or performance of a chemical, physical, or thermodynamic process in any of a plethora of variously sized host microwave ovens or disparate process streams in response to a predetermined code. The present invention allows a host microwave oven or process stream to functionally operate by user independent commands. In the preferred embodiment a system controller is operatively disposed intermediate a data entry mechanism, provided for the entry of a predetermined BIOS interpretable and scaleable code, and the host microwave or process stream. The controller has a central processing module, a memory module, and a plurality of input and output devices to send and receive data to and from the host microwave oven and the data entry mechanism. The interpretive BIOS machine is operatively embedded in the controller's memory.

The interpretive BIOS machine has a plurality of data structures that have data determined by the predetermined code. These data structures provide the controller with instructions to command and control the host microwave oven or process stream, whereby the host microwave oven or process stream operates with user independent functional commands.

The present invention contains interpretive data structures that provide both factory-selected and user defined scalars (or calibration factors) and selection of the mode of operation. The calibration data structures allows the user of the present invention to scale the power level and/or the power level duration of the host microwave oven or process in response to performance degradation with age of the magnetron tube or process elements, or variations of host unit in-situ elevation above mean sea level. The selection mode also allows the user of the host microwave oven or process stream to use the present invention to operate the host microwave oven or process stream in its original conventional mode of operation.

Accordingly, an object of the present invention is to provide a BIOS that will enable or allow transfer of software application across incompatible hardware and operating systems environments.

Another object of the present invention is to provide a BIOS that allows a set of semantic and syntactic rules that determines the behavior of functional units in achieving communications across application programs and dissimilar microwave ovens or process streams.

Another object is to enable food manufacturers, cookbook authors, chemical or physical or thermodynamic process designers and so forth to express complex processing instructions from within a universal BIOS interpreted and host unit internally scaleable user friendly (yet functionally rich when interpreted by the BIOS) symbolic code.

Other objects, features and advantages of the present invention will become apparent upon reading the following detailed description of embodiments of the invention, when taken in conjunction with the accompanying drawings and the appended claims.

BRIEF DESCRIPTION OF THE DRAWINGS

The invention is illustrated in the drawings in which like reference characters designate the same or similar parts throughout the figures of which.

DESCRIPTION OF THE PREFERRED EMBODIMENTS

Figure 3:
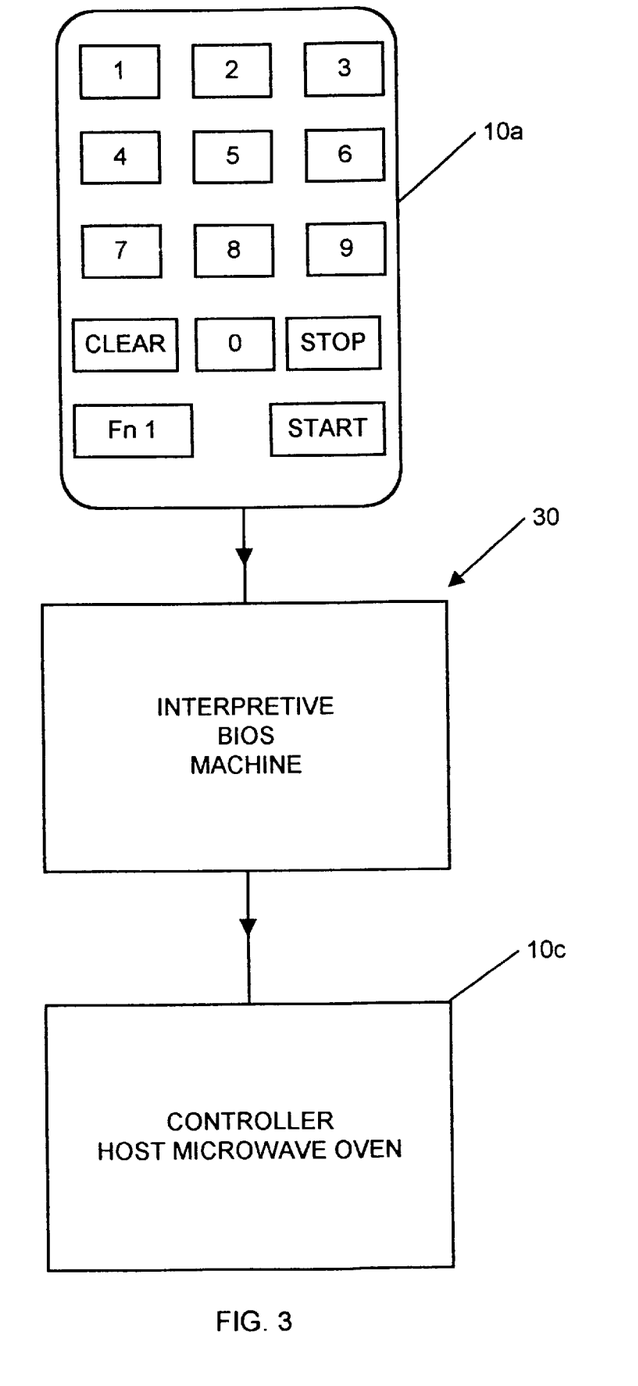
FIG. 3 illustrates the present invention disposed intermediate the key pad of FIG. 1 and the controller of the host microwave oven.
Figure 5:
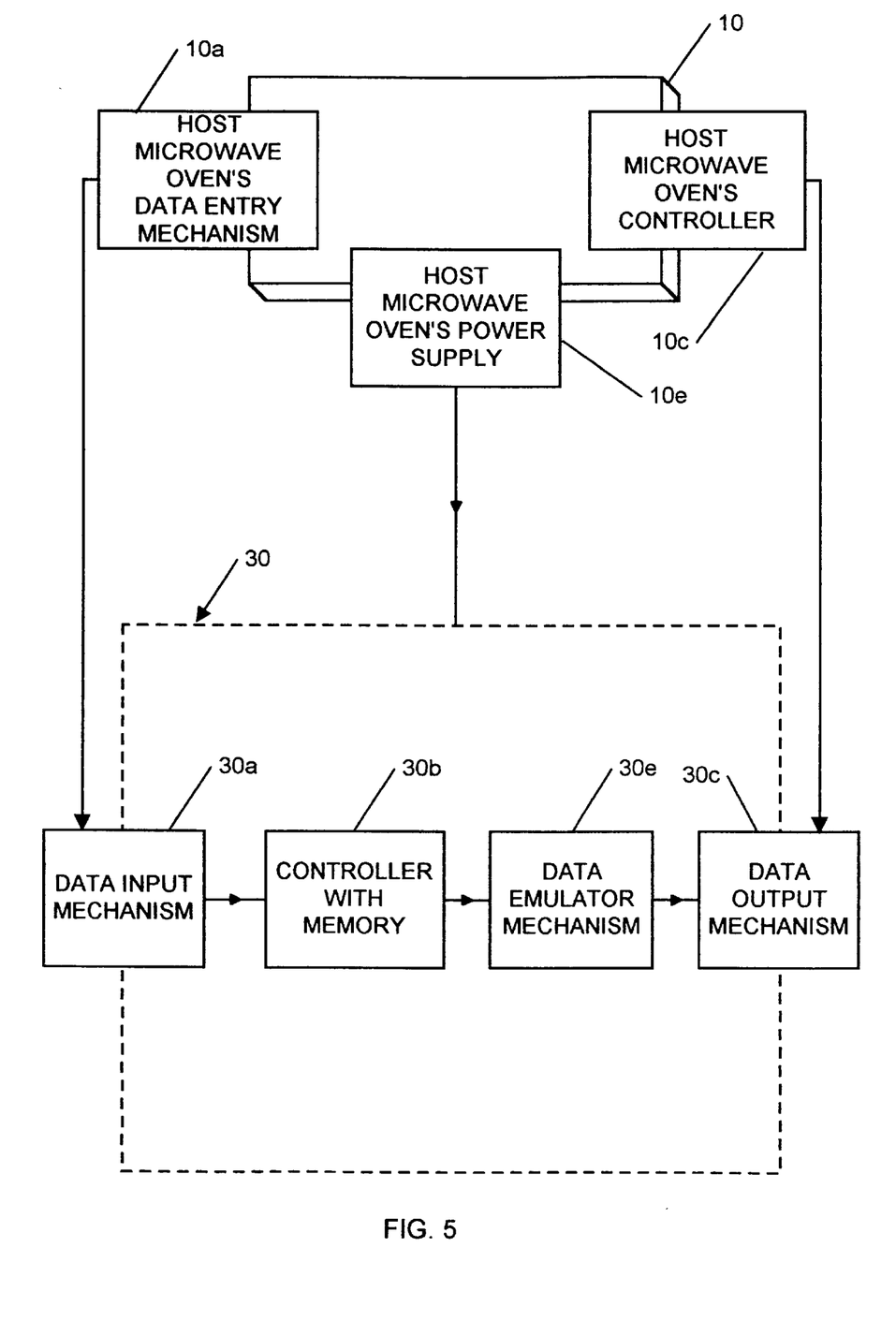
FIG. 5 illustrates a block diagram of the interpretive BIOS machine connected to the host microwave oven.
Figure 6:
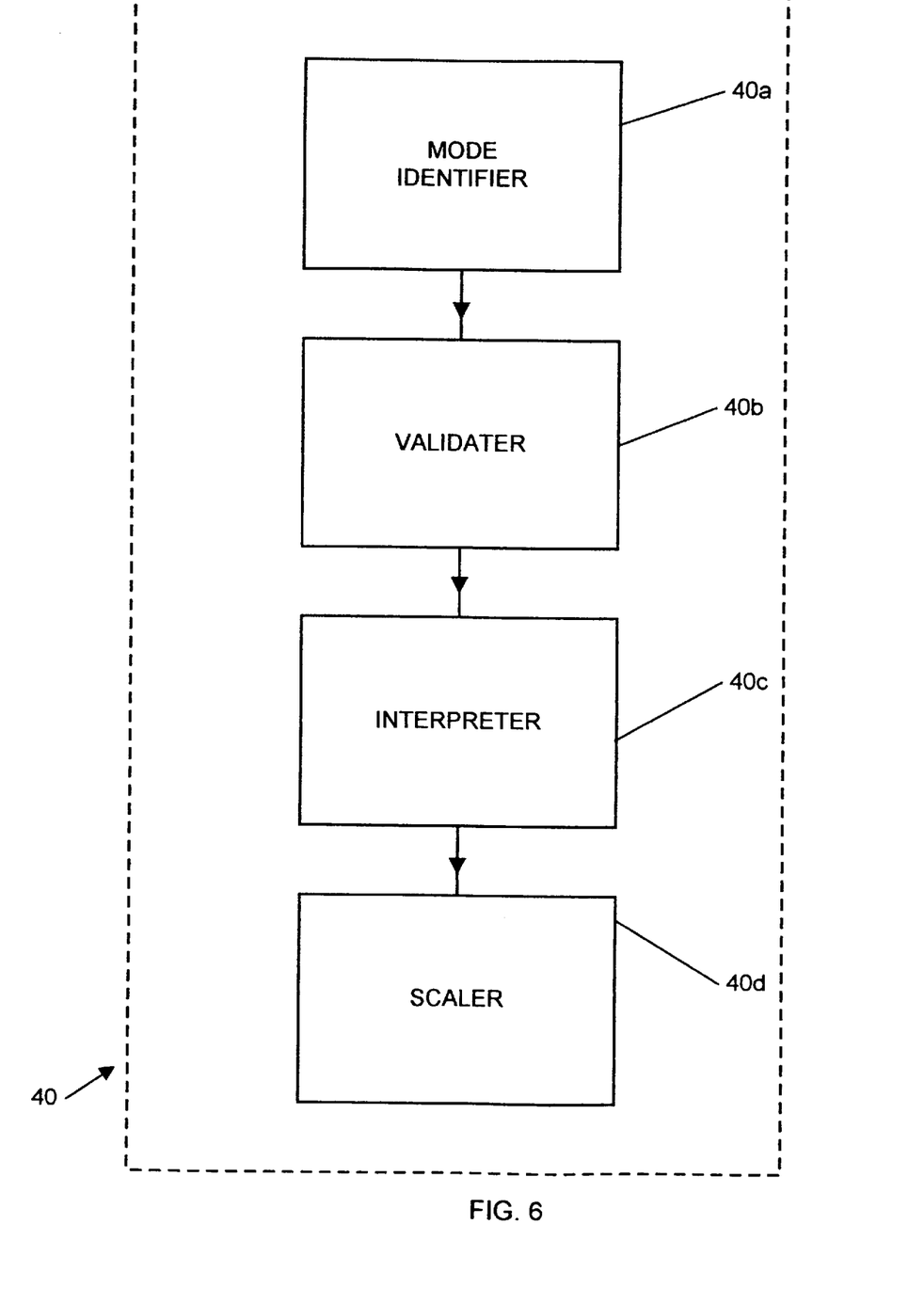
FIG. 6 illustrates the architecture for interpretive BIOS machine of FIG. 5.
Figure 7:
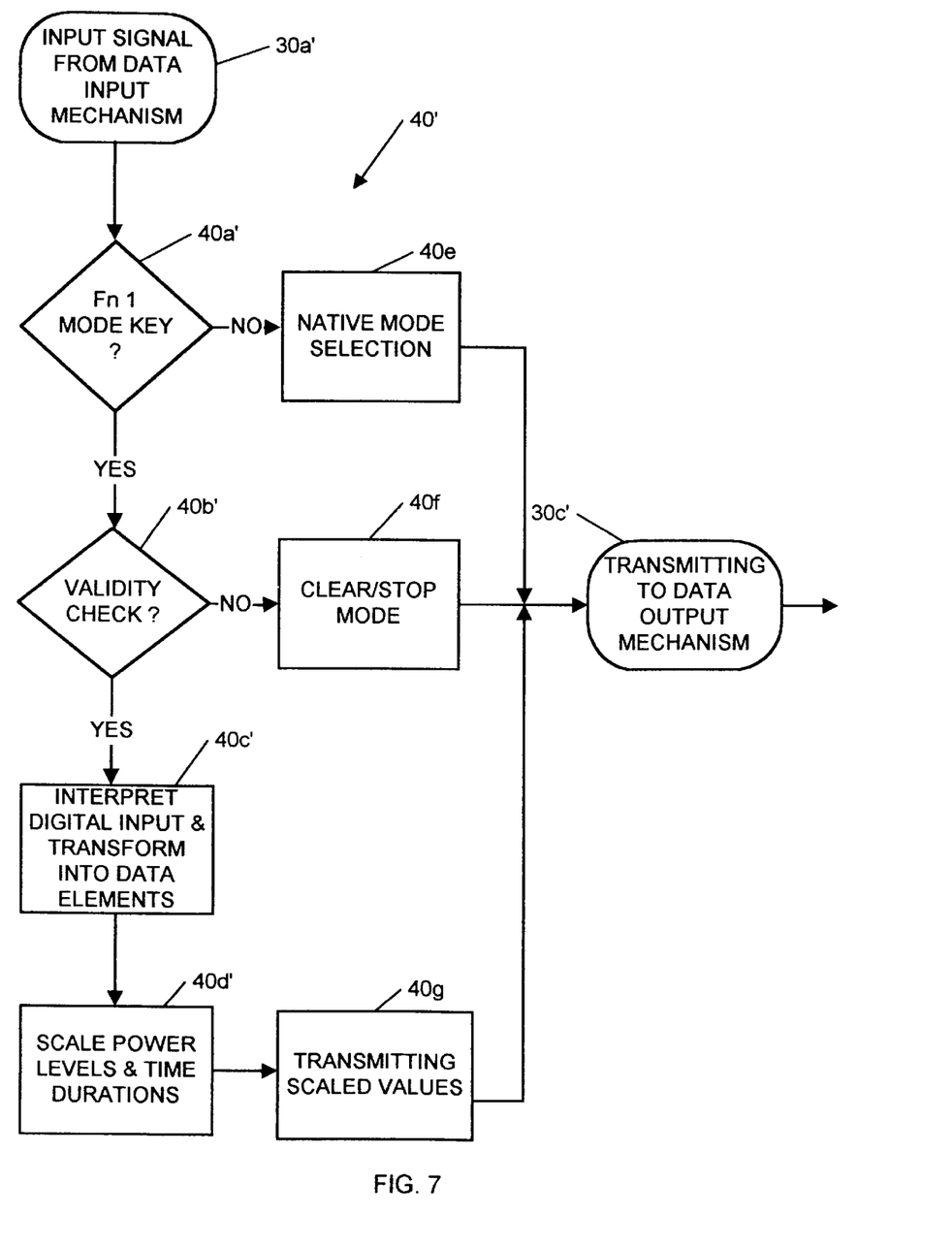
FIG. 7 illustrates a flow diagram of FIG. 6, FIG. 8 illustrate a flow diagram of the validator of FIG. 6.

The interdependence of the element numbers of the drawings has been referenced above and for the convenience of the reader will be reiterated here by citing an example of the flow of element numbers to drawings. This example is intended for illustrative purpose only: interpretive BIOS machine 30, FIG. 3, is further illustrated in a block diagram 30, FIG. 5. The architecture for interpretive BIOS machine 30, FIG. 5, is generally illustrated at 40, FIG. 6. Architecture 40 is further illustrated at 40', FIG. 7. Mode key 40b', FIG. 7, is further illustrated at 40b', FIG. 8, containing elements 40b'a to 40b'f.

Figure 1:
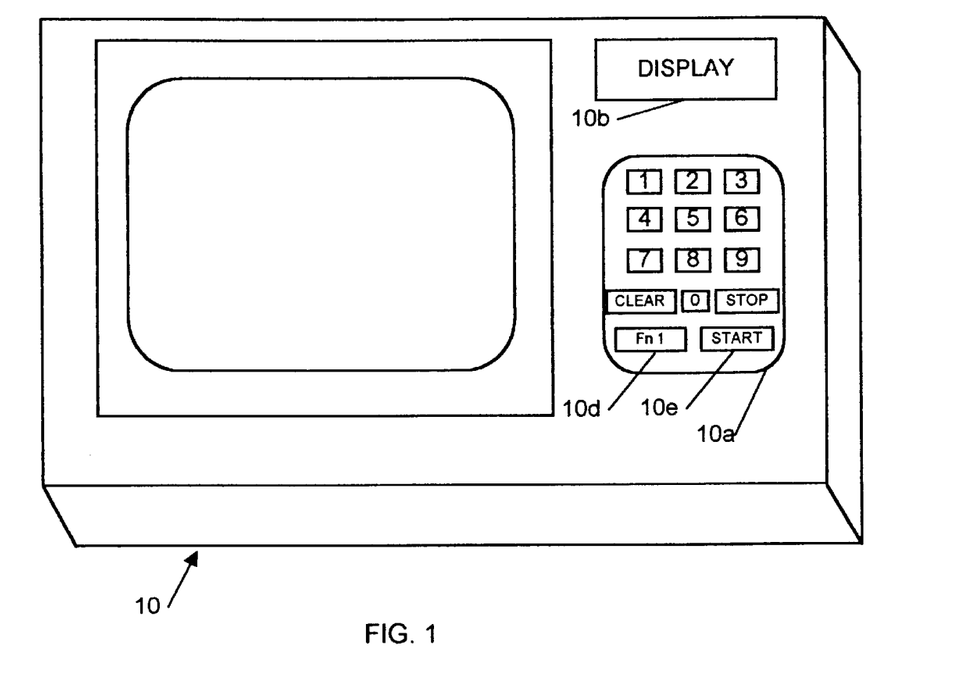
FIG. 1 illustrates a host microwave oven.
Figure 2:
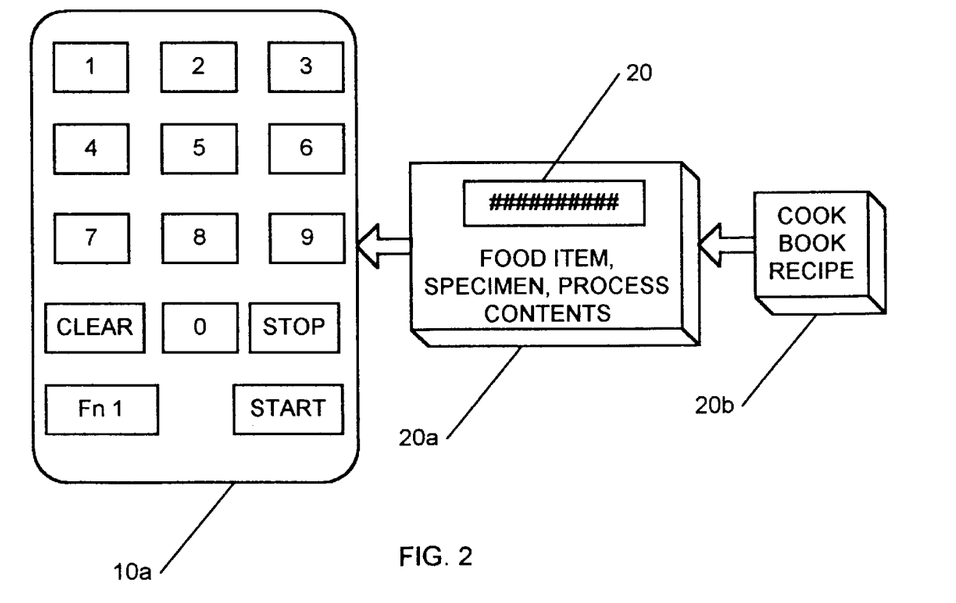
FIG. 2 illustrates a block diagram showing a symbolic code being entered into the keypad of FIG. 1.

FIGS. 1–3 illustrate a typical microwave oven 10 used by households, restaurants, and other types of institutions that prepare and cook food. An example of a typical microwave oven would be a microwave oven manufactured by Cober Electronics, Inc., although any microprocessor, computer, or ASIC (Application Specific Integrated Circuit) controlled microwave oven or process stream is usable and operable in conjunction with the present invention. Microwave oven 10, for the purposes of illustration only, will host the present invention.

Host microwave oven 10 has a data entry mechanism 10a, a display 10b, and a computer or controller with memory 10c, as shown in FIG. 3. Data entry mechanism 10a may, if desired, be any type of data entry mechanism suitable for inputting data into host microwave oven 10. Data entry 10a mechanism may, if desired, transmit its data by serial or parallel format using any type of transmission medium such as, but not limited to, key pad entry, bar code reader, modem, computer or telephonic communications network or any other medium that allows transmissions of data. An example of data entry mechanism 10a would be a key pad part number KBD-KPX17P, manufactured by Alps, San Jose, Calif. Data entry mechanism 10a for the purposes of illustration only will be discussed as a conventional touch responsive key pad known to those of ordinary skill in the art, although any data entry mechanism will function in conjunction with the present invention. Data entry mechanism 10a has at least one mode key. If desired, a plurality of mode keys may be implemented in conjunction with the present invention. For the purpose of illustration only, key Fn 1, 10d, of data mechanism 10a will indicate the desire by the user of microwave oven 10 to enter a selected predetermined code 20, as shown in FIG. 2. Selected code 20 represents a predetermined instruction set for heating or cooking a manufactured food item 20a. That predetermined code may, if desired, be listed in a recipe cook book 20b containing a plurality of predetermined codes. The cook book 20b may, if desired, contain selected codes along with conventional cooking instructions. Selected code 20 may, if desired, be comprised of at least one numeral, letter or symbol. An example of selected code 20 is a series of seven numbers. Manufactured food item 20a may require a plurality of processing steps to fully cook the foodstuffs properly. In this particular case selected code 20 may represent any combination of process, steps of cooking, or cookbook recipe. Ordinarily, the code 20 will be printed on or otherwise associated with the food packaging. Alternatively, a book of codes 20 can be assembled and provided to the user, most likely by the manufacturer of the food, a cookbook author, or process designer.

The present invention is an interpretive BIOS machine illustrated generally at 30, as shown in FIG. 3. Interpretive BIOS machine 30 is operatively disposed between the data entry mechanism 10a of the host microwave oven 10 and controller 10c. Interpretive BIOS machine 30 receives and processes selected code 20 and then outputs its interpreted and scaled instruction set to controller 10c. The interpreted instruction set provides host microwave oven 10 with user independent instructions for the cooking of food items desired by the user. The interpreted instruction set may contain one or a plurality of data fields that will compensate for variations in oven magnetron power, other similarly sized magnetron tube microwave oven performance variations, in-situ microwave oven elevation above sea level, aging of the host microwave oven, and the variation of cooking recipe requirements.

Figure 4:
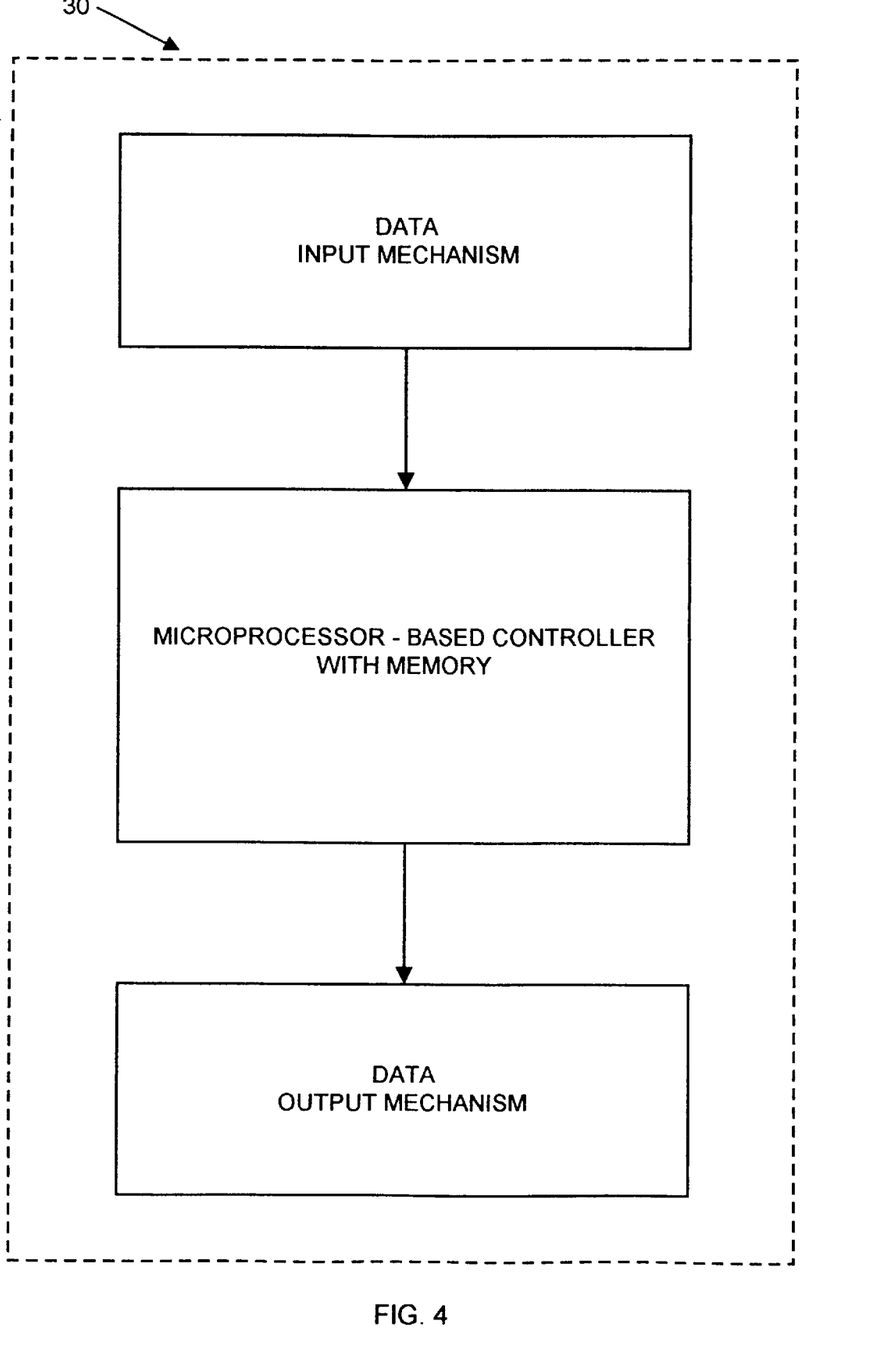
FIG. 4 illustrates a block diagram of an interpretive BIOS machine.

A top level illustration of interpretive BIOS machine 30 is shown in FIG. 4. Interpretive BIOS machine 30 comprises a data input mechanism 30a, a microprocessor base controller 30b, and a data output mechanism 30c. As shown in FIG. 5, interpretive BIOS machine 30 receives its operational power from power supply 10e. Data input mechanism 30a comprises a buffer that connects the output of data entry mechanism 10a of host microwave oven 10 to the input of controller 30b. An example of this buffer would be at least one Hex Noninverting Buffer, MC14050b, manufactured by Motorola, Inc., Phoenix, Ariz. Controller 30b commands and controls all the operational functions of the present invention. An example of controller 30b that may, if desired, be used in conjunction with the present invention is MC68HC11 manufactured by Motorola, Inc. This particular controller has an on-board memory used for storing data structures that provide controller 30b with instructions as to the operational features of the preset invention. Data emulator mechanism 30e is connected to controller 30b and receives encoded instructions from controller 30b. Data emulator 30e transforms those encoded instructions into suitable data for controller 10c. An example of data emulator would be a plurality or bank of operationally connected CD 5053 or CD 4051 devices. The output of data emulator 30e is connected to data output buffer 30. The output of mechanism 30c is connected to controller 10c. Interpretive BIOS machine 30 is completely buffered from host microwave oven 10 and is transparent to the user of host microwave oven 10. This buffering allows host microwave oven 10 to operate utilizing the present invention or to operate in the native mode, i.e., receiving data inputs directly from the user. The architecture for interpretive BIOS machine 30 is generally illustrated at 40, as shown in FIG. 6. Architecture 40 contains a plurality of data structures that have their data determined in part by selected code 20 and in part by the interaction between respective data structures. These data structures provide controller 30b with instructions to command and control the host microwave oven 10 thereby allowing host microwave oven 10 to function independent of user commands.

Mode Identifier data structure 40a, as shown in FIG. 6, receives its data from data entry mechanism 10a. Mode Identifier data structure 40a has data elements that determine if the interpretive BIOS machine is requested for activation or if the user of host microwave oven 10 desires to operate the oven in its native mode. Native mode, once detected by Mode Identifier data structure 40a, operates without the assistance of interpretive BIOS machine 30. Mode Identifier data structure 40a passes the request for BIOS machine activation to Validator data structure 40b. Validator data structure 40b has elements that determine the validity of the input code 20 selected by the user. If Validator data structure 40b determines that selected code 20 is valid, data structure 40b will pass that result to Interpreter data structure 40c. Upon receiving Validator result, Interpreter structure 40c will transform user input code 20 into a data element set containing a plurality of data fields representing the requested duration and power level process instruction set of the selected code 20. Interpreter structure 40c may, if desired, transform user input code 20 into a data element set containing a plurality of data fields representing requested time duration and variable power level process instruction set of selected code 20.

Scalar data structure 40d receives the data element set from Interpreter data structure 40c. Scalar data structure 40d transforms those data fields into suitable duration and power level requirements depending on the oven manufacturer's predetermined selection of scaling factor and additional user defined scale factor(s). Scaling factor(s) will be disclosed in greater detail hereinbelow. The scale duration and power data elements are encoded into a format that is understood by the host microwave oven 10.

FIG. 7 shows a logical flow diagram, indicated generally as 40' of the operational features of the interpretive BIOS machine 30 provided by architecture 40. An input data signal 40a' is received from host microwave oven 10. This input may, if desired, be accompanied by data generated by the user depressing the Fn 1 mode key 10d at least once. The mode of operation selected by the user is now determined. If Fn 1 10d is present the interpretive BIOS machine 30 has been selected. If Fn 1 10d is not present the native mode has been selected by the user and that selection 40e is transmitted to host microwave oven 10. The validity 40b' of input data signal 30a' is now verified. If there is user error in input data signal 30a' the user will be notified by instructions that appear on display 10b. If inaccuracies in data signal 30a' cannot be resolved, the validity check 40b' will default to a clear/stop function 40f and transmit that signal to the native mode of host microwave oven 10. If validity 40b' is verified, data signal 30a' is interpreted 40c' and transformed into data element set 40c' containing power levels and time duration (s). Data element set 40c' is then scaled at block 40d' to the operating characteristics of host microwave oven 10. Those scaled values 40d' are then transmitted at block 40g to host microwave oven 10 for implementation in the process of cooking food item 20a.

Figure 8:
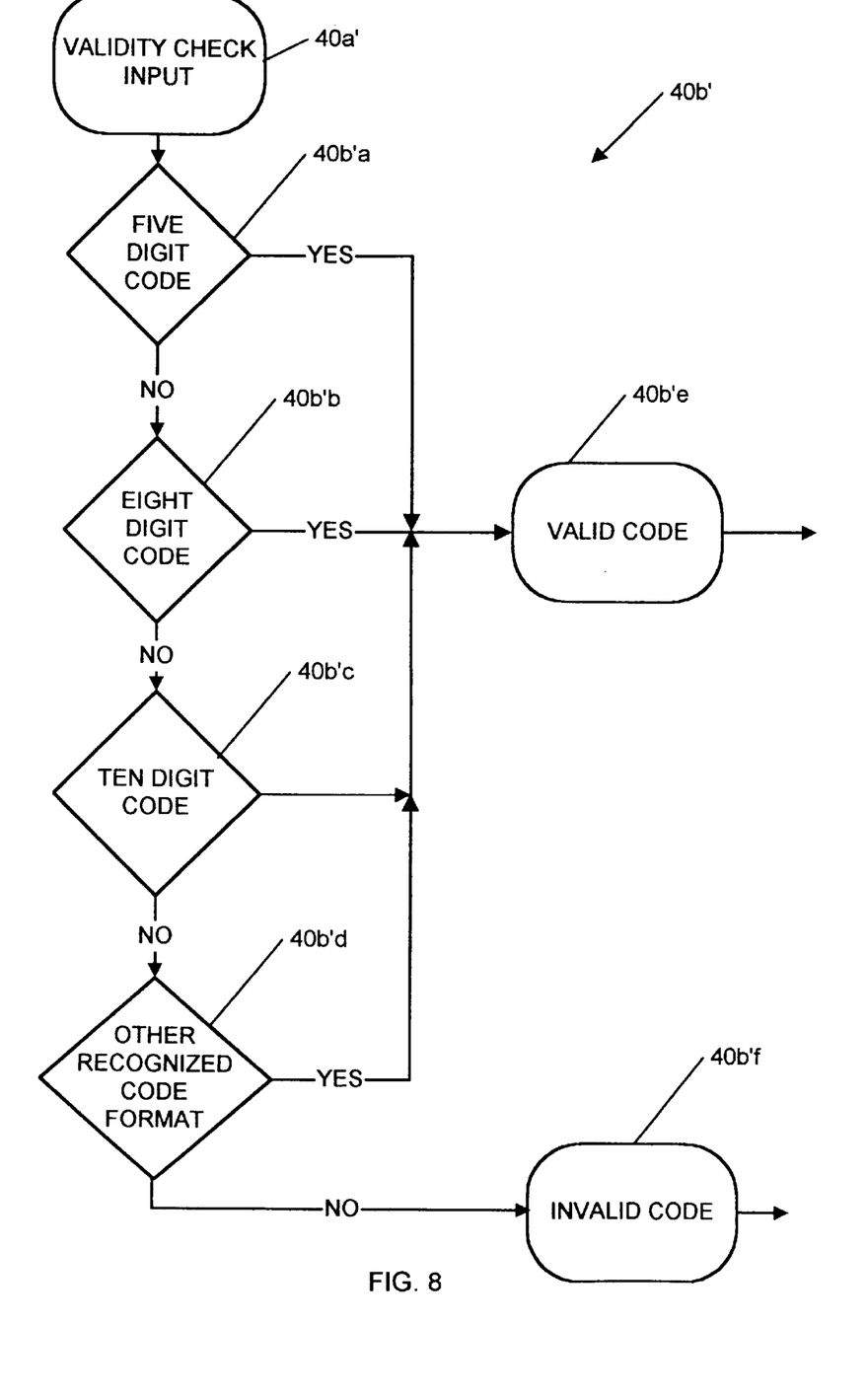

FIG. 8 shows a more detailed diagram 40b' of validation data structure 40b. Mode function 40a transmits an encoded data stream that is received by validated data structure 40b'. That data contains at least one data bit and may, if desired, contain a plurality of data bits. In the preferred embodiment, a five digit code at block 40b'a is transmitted by mode function at block 40a. This transmission is for illustrative purpose only. In fact, any number of digits may be transmitted. An eight digit code at block 40b'b, a ten digit code at block 40b'c, and other Interpretive BIOS Machine recognized code format(s) at block 40b'd may be transmitted. If the code at block 40b'e is valid it is transmitted to data structure 40c. If the code at block 40b'f is invalid, a clear/stop function is transmitted to host microwave oven 10.

Figure 9:
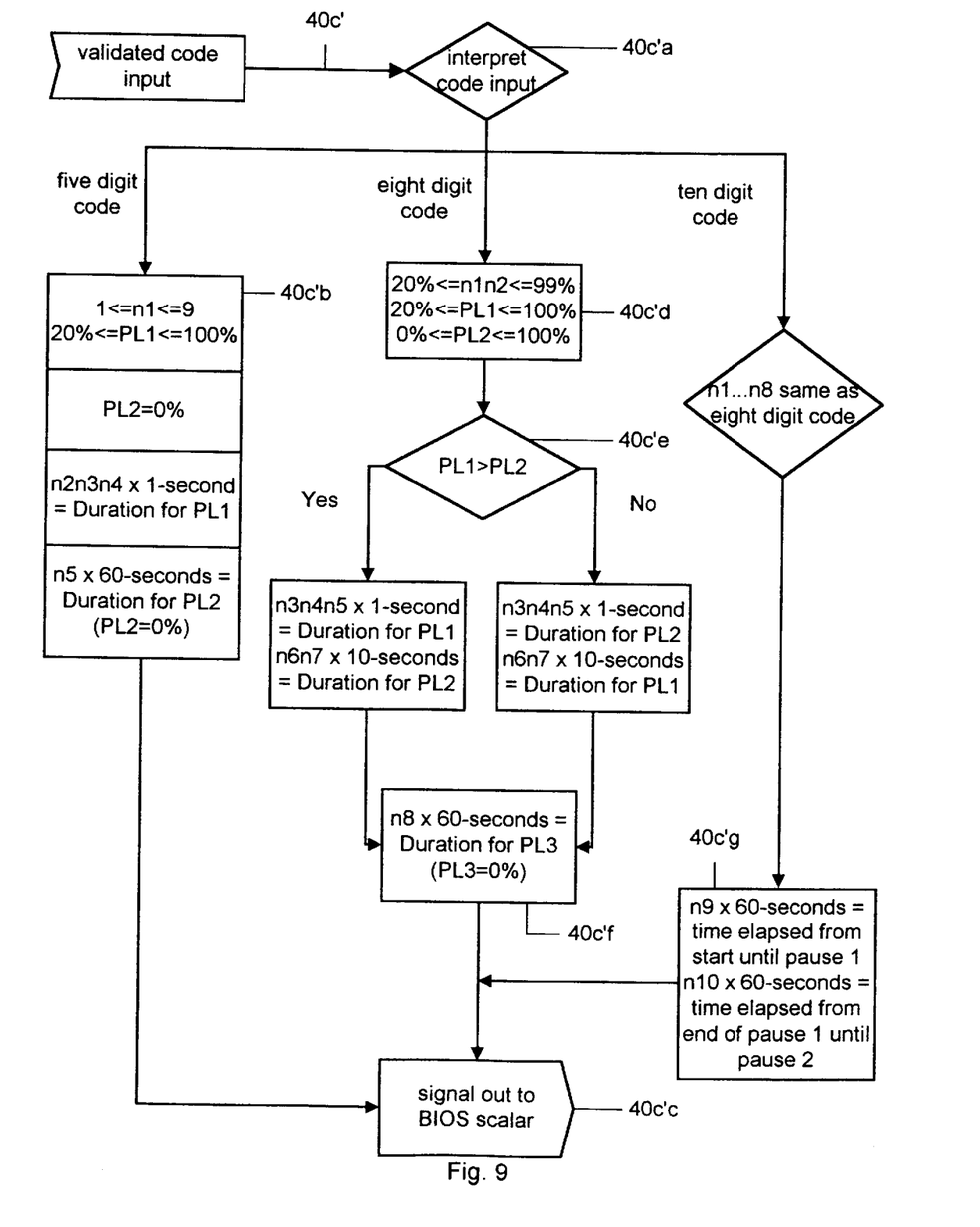
FIG. 9 illustrates a flow diagram of the interpreter of FIG. 6.

FIG. 9 shows a more detailed diagram of decode data structure 40c is illustrated at block 40c'. A validated code at block 40b'e is received and the code input is interpreted at block 40c'a as being a five, eight, or ten digit code. If the interpreted code is five digits at block 40c'b, the first digit n1 is equal to or greater than one and equal to or less than nine and is interpreted by the BIOS to Power Level 1 (PL1); expressed as a percentage of the magnetron tube's total output capacity; i.e., 100%, 90%, and so forth. For a five digit code power level PL2 is equal to 0%. PL1 duration is equal to the digit n2, n3, and n4 multiplied by one second. The five digit code is now interpreted and transformed into a new code representing specimen 20a's requirements for processing or cooking. This requirement for processing or cooking will vary depending on the specimen involved. This new five digit code is transmitted 40c'c to the scalar data structure 40d. If an eight digit code at block 40c'd is received by interpret code input at block 40c'a, digit n1 and n2 are equal to or less than ninety-nine and equal to or greater than twenty. Power level PL1 is less than or equal to one hundred percent and equal to or greater than twenty percent. Power level PL2 is less than or equal to one hundred percent and equal to or greater than zero percent. If PL1 is equal to or greater than PL2 at block 40c'e, digits n3, n4, and n5 are multiplied by one second and are equal to time duration one. Duration for PL2 is equal to digit n6 and n7 multiplied by ten seconds. If PL2 is equal to or greater than PL1 40c'e, digits n3, n4, and n5 are multiplied by one second and are equal to power level two duration. Duration for PL1 is equal to digit n6 and n7 multiplied by ten seconds. Time duration three is equal to n8 multiplied by sixty seconds with power level PL3 equal to zero at block 40c'f. The eight digit code is now decoded and transformed into a new code representing the requirement for processing or cooking of specimen 20a. This new eight digit code is transmitted at block 40c'c to the scalar data structure 40d. A ten digit code is transformed in much the same way as the eighth digit code except for digit n9 that is multiplied by 60 seconds and is then equal to the time that has elapsed from the start process until pause one. Digit n10 is multiplied by sixty seconds and is then equal to the elapsed time since the end of pause one until pause two. (Enablement of pause one and pause two allows for user intervention and intermediate user actions during the processing or cooking sequence.) The user determines when the pause is complete and the control program is to resume by pressing Fn 1-10d. Like the five and eight digit code the ten digit code is transmitted to scalar data structure 40d.

Scalar data structure 40d has both manufacturer selected and user selected components. Scalar data structure 40d has its manufacturer selected universe of data empirically derived from the testing of a plurality or the universe of microwave ovens. A statistically derived sample of the universe of microwave ovens was selected. The sample ovens were each tested in an environmentally controlled and reproducible atmosphere to ensure repeatability of the test due to variations in ambient temperature, humidity, and atmospheric pressure. A control microwave oven was also tested to ensure accuracy and repeatability of the test. An example of the control microwave oven would be a microwave oven manufactured by Cober Electronics, Inc. The control microwave oven was tested to a control standard defined as a microwave oven containing a 1200 watt magnetron tube. The oven is placed in an environment maintained at an atmospheric pressure corresponding to that of an altitude of zero feet above mean sea level at a constant temperature of 20° C. and an ambient humidity of 80%.

The test comprised the placement of one liter of water of specifically known and reproduceable chemical composition, molarity, molality, and dielectric properties in each microwave oven with a pyrometer disposed in each liter of water. The magnetron tube of a selected microwave oven was activated and the time to raise one liter of water one degree centigrade was recorded. The results of that test are generally illustrated in graph 60 in FIG. 10. The median time range versus the universe of microwave ovens is illustrated at point 60a. The highest deviation from point 60a is illustrated at point 60b. The lowest deviation from point 60a is illustrated at point 60c.

Figure 10:
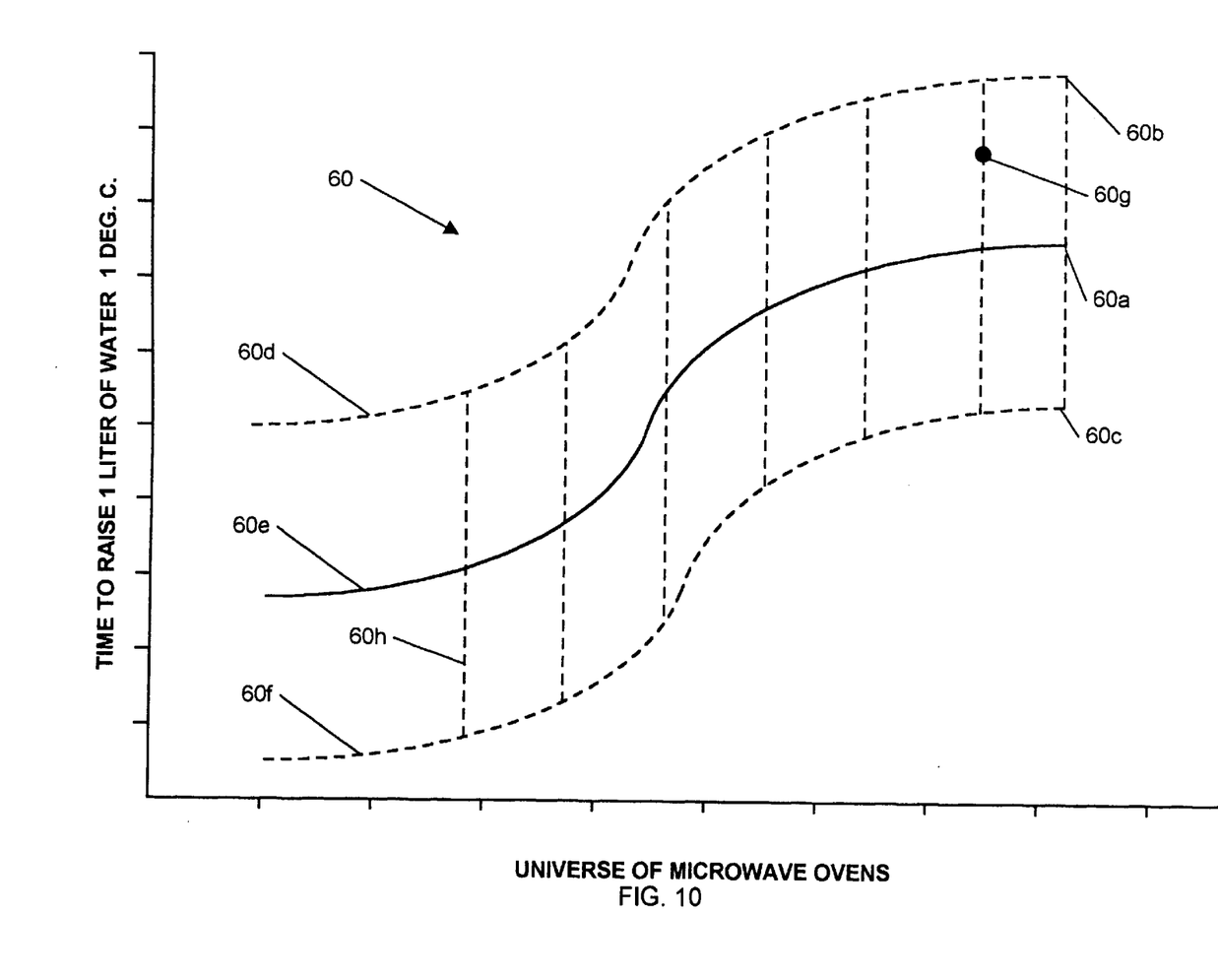
FIG. 10 is a test result graph.

Points 60a, 60b, and 60c can be correlated to the highest power, measured in watts, of the magnetron tube used in each test. Conversely, points 60d, 60e, and 60f can be correlated to the lowest power, measured in watts, magnetron tube used in this test.

A plurality of scalar values may now be determined from graph 60. Those scalar values are derived from the distance a select scalar point is to the median 60a, measured along the vertical axis of graph 60. Any number of points may, if desired, be disposed along any given vertical line extending from median line 60a. An example of that scalar value is scalar point 60g representing a value of 0.25 and scalar point 60h 4.0. The selected scalar values when applied to data element set 40c' transform the power and time duration contained within data element set 40c' into operating characteristics for microwave oven 10.

To compensate for the magnetron tube (and other components) as well as the power level output degradation of microwave oven 10 over the useful life of the oven, a dynamic user-initiated BIOS calibration scalar component may be activated. The dynamic BIOS calibration updates in real time the power output operating and performance characteristics of the microwave oven 10 to the BIOS output scale level selected at the time of manufacture. A method to implement the calibration of microwave oven 10 is to depress Fn 1, 10d twice, whereupon display 10b will indicate the current BIOS operating level. By depressing Fn 1 10d simultaneously with a selected keypad number corresponding to the degree of BIOS, timed duration output scale level will increase desired scale value. An example of this would be pressing 1 causes a 5% BIOS output scale level increase, pressing 3 causes a 10% BIOS output scale level increase, etc. The display will flash at least three times, indicating calibration is in process and the display 10b will now display the selected increase or decrease to the BIOS scaled value. To reset the BIOS scaled value to the original value, Fn I 10d is depressed along with the key zero.

Another method of calibrating power level duration for microwave oven 10 is by depressing Fn 1 10d simultaneously with the start key 10e. This action will commence the National Postal Code ("zip code") BIOS calibration. Display 10a will flash the factory set BIOS National Postal Code. If this code is different than user's current postal code, the user may, if desired, enter their current National Postal Code. Interpretive BIOS machine 30 reads a stored National Postal Code corresponding to the elevation above mean sea level and the BIOS machine 30 performs a self calibration to adjust the power level duration to reflect the increase in elevation. The elevation above mean sea level may, if desired, be entered directly or a one digit direct input read from an Elevation Range-Performance Characteristic Table may be entered. In all cases interpretive BIOS machine 30 will perform a self calibration to increase or decrease the power level duration of microwave oven 10.

The user of host microwave oven 10 may now cook food item 20a without regard for type of microwave oven employed, the power or aging of the magnetron tube of the selected microwave oven, or the in-situ elevation above mean sea level of the installed microwave oven or process stream.

A preferred mode of operation of the present invention is to provide controller 30b with a memory containing an embedded interpretive BIOS machine 30. Controller 30b is operatively disposed within microwave oven 10. Microwave oven 10 provides a data entry mechanism 10a that is operatively connected to oven 10 and controller 30b. The data entry mechanism 10a receives data from the user of microwave oven 10 and then transmits that data to the interpretive BIOS machine 30. Interpretive BIOS machine 30 selects a mode of operation from the received data. Interpretive BIOS machine 30 then validates the selected mode of operation, interprets the received data into time duration and power level data, converts the time duration and power level data to selected BIOS power level(s) and power level time duration(s). The resulting process control instruction set, through a series of scalars, is then scaled to the host oven or host process.. Interpretive BIOS machine 30 then transmits the interpreted and scaled data to the microwave oven 10 whereupon the microwave oven operates as per BIOS interpreted and scaled time duration(s) and power level(s).

The present invention may, if desired, be programmed in any suitable programming language known to those skill in the art. An example of that programming language is disclosed in *C Programming Language*, 2/e, Kernighan & Richtie, Prentice Hall, (1989).

While the present invention has been described specifically with respect to microwaves being the energy source employed, it is to be understood that other energy sources along the electromagnetic radiation spectrum can be employed by modifying or using different ovens or housings. For example, ultraviolet, laser light, infrared, alpha, beta, gamma, or x-ray radiation, or combinations thereof, can be employed. It would be a matter of developing specific profiles for the items to be "processed" by the radiation. Such items are not limited to food, but may also include, but are not limited to, painted articles where the paint is to be cured by infrared or UV light, coatings which may be cured by UV light, polymerization by UV light, irradiation of objects by radioactive energy beams, cutting, warming or melting of objects by infrared or laser light, and the like. In essence, wherever energy is to be directed at an article and a multi-step or multi-phase sequence of operations is to occur (or a single step or phase) and a profile of radiation application can be developed, the present invention can be used to permit such profile to be entered into a BIOS or machine which will accept and convert the data into operational signals which control, via a microprocessor or similar controller, the actuation, direction and characteristics of the energy source with respect to the article to be processed. In place of the excitation of water molecules, the respective energy processing properties can be determined with reasonable predictability to develop standard codes for processing standard items. Such items can then be predictably and repeatably processed to reduce random variation in result and improve quality control and quality assurance.

Therefore, while the present invention has been described with respect to food and microwaves, the description is intended to encompass the abovementioned variations and alternatives. Although the specific mechanisms for each radioactive source and article to be processed are not described, it would be obvious to those skilled in the respective art to be able to standardize profiles with minimal experimentation and to modify the hardware described herein to accommodate a different energy source, with concomitant protective and safety features considered.

While the present invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

I claim:

1. An interpretive BIOS machine for a computer or microprocessor controlled host microwave oven or chemical, physical, or thermodynamic process steam, the oven or process stream having a data entry mechanism operatively disposed thereon for receiving a predetermined code derived externally therefrom, comprising:

a) a system controller having a memory, said controller operatively disposed intermediate the data entry mechanism and the host microwave oven or process stream; and, b) a plurality of functions stored in said memory, said functions having data determined by the predetermined code, said functions transforming selected user independent commands implemented by said controller.

2. An interpretive BIOS machine for a computer or microprocessor controlled host microwave oven or chemical, physical, or thermodynamic process stream the oven or process stream having a data entry mechanism operatively disposed thereon for receiving a predetermined code derived externally therefrom, comprising:

a) a system controller having a memory, said controller operatively disposed intermediate the data entry mechanism and the host microwave oven or process stream;

b) means, stored in said memory, for receiving and interpreting the predetermined code;

c) a scalar function having data determined by said interpreted predetermined code, said scalar function transforming said data into operating characteristics of the host microwave oven or process steam, whereby said controller provides the host microwave oven or process stream with user independent functional commands.

3. The interpretive BIOS machine as recited in claim 2, further comprising:

means for calibrating the host microwave oven or process stream.

4. The interpretive BIOS machine as recited in claim 3, wherein said calibrating means comprises entering a selected code that compensates for elevation above mean sea level.

5. The interpretive BIOS machine as recited in claim 4, wherein said code is a selected National Postal Code.

6. The interpretive BIOS machine as recited in claim 5, wherein said code is selected from an elevation range performance characteristic table.

7. The interpretive BIOS machine as recited in claim 3, wherein said calibrating means comprises selecting a scaling factor that increases or decreases time duration of power level(s) and/or actual power levels of the microwave oven or process stream.

8. A method of controlling of cooking of food in a microwave oven or conduct of a chemical, physical, or thermodynamic process stream wherein the microwave oven or process stream functionally operates by user independent commands, comprising the steps of:

a) providing a controller with a memory containing an embedded interpretive BIOS machine, said controller operatively disposed within the microwave oven or process stream;

b) providing a data entry mechanism connectively disposed on the microwave oven or process stream and connectively disposed to said controller;

c) receiving data into said interpretive BIOS machine from said data entry mechanism, said data derived externally from said data entry mechanism;

d) selecting a mode of operation from said received data;

e) validating said selected mode of operation;

f) interpreting said received data into time duration and power level data;

g) converting said time duration and power level data to BIOS selected power level and time duration data;

h) scaling of said selected BIOS power level and time duration data; and, i) transmitting said scaled selected BIOS power level and time duration data to the microwave oven or process stream, whereby the microwave oven cooks food relative to said scaled tine duration and scaled power levels or the chemical, physical, or thermodynamic process within a process stream is conducted according to BIOS scaled time duration(s) and power level(s).

9. The method of claim 8, further comprising the steps of:

(a) activating a calibration mode for the microwave oven or process stream;

(b) inputting selected encoded calibration data into said data entry mechanism;

(c) processing said selected encoded calibration data by said controller;

(d) indicating completion of said processing step by said controller, whereby the microwave oven maintains accurate power level duration.

10. The method of claim 9, wherein said calibration mode step comprises depressing a mode key disposed on said data entry mechanism at least once.

11. The method of claim 9, wherein said inputting selected encoded calibration data step comprises inputting data selected from the group consisting of a selected National Postal Code, a selected elevation above mean sea level, or a number selected from an elevation range performance characteristic table.

12. An interpretive BIOS machine for a computer or microprocessor controlled host microwave oven, the oven having a data entry mechanism operatively disposed thereon for receiving a predetermined code derived externally therefrom, comprising:

a) a housing having a cavity disposed therein;

b) a door disposed on said housing providing entry into said cavity;

c) means for radiating electromagnetic energy operatively disposed and adjacently spaced to said cavity; said cavity sized to receive said electromagnetic energy;

d) means for controlling said electromagnetic energy radiated into said cavity;

e) a data entry mechanism, operatively disposed on said housing for the entry of the predetermined codes; and, f) at least one function stored within said means for controlling said electromagnetic energy, whereby said function is capable of interpreting and transforming said predetermined code into encoded data entries for the functional control of the oven.

* * * * *